United States Patent [19]
Karim-Panahi et al.

[11] Patent Number: 5,438,882
[45] Date of Patent: Aug. 8, 1995

[54] ROTATING SHAFT VIBRATION MONITOR

[75] Inventors: Khosrow Karim-Panahi, Palo Alto; James H. Terhune; Paul J. Zimmerman, both of San Jose, all of Calif.

[73] Assignee: General Electric Company, Schenectady, N.Y.

[21] Appl. No.: 303,541

[22] Filed: Sep. 9, 1994

Related U.S. Application Data

[63] Continuation of Ser. No. 7,929, Jan. 25, 1993, abandoned.

[51] Int. Cl.⁶ .............................................. G01L 3/00
[52] U.S. Cl. .................. 73/862.324; 73/862.195
[58] Field of Search ................. 73/862.324, 862.326, 73/862.327, 862.195

[56] References Cited

U.S. PATENT DOCUMENTS

| | | | |
|---|---|---|---|
| 4,305,294 | 12/1981 | Vasile et al. | 73/579 |
| 4,347,748 | 9/1982 | Pierson | 73/862.326 |
| 4,352,295 | 10/1982 | Maehara et al. | 73/862.326 |
| 4,525,068 | 6/1985 | Mannava et al. | 73/862.326 |
| 5,001,937 | 3/1991 | Bechtel | 73/862.326 |
| 5,297,044 | 3/1994 | Sakaki et al. | 73/862.325 |

FOREIGN PATENT DOCUMENTS 0285827  10/1988  European Pat. Off. ........ 73/862.327

OTHER PUBLICATIONS

Madzsar, George C., "A Fiber Optic Sensor For Non-contact Measurement of Shaft Speed, Torque and Power," 36th Int'l Symp. sponsored by the Instrument Society of America, Denver, Colo., May 6–10, 1990.
"F-1001 Strain Gage Telemetry Transmitter", Binsfeld Engineering Inc., Maple City, Mich.
"Reliable Torque Measurements. Tor Ximitor", Bently Nevada Corp., Minden, Nev. (1991).
"Sensor Applications Notebook, vol. I, The Forces in Machines", Sensor developments Inc., Lake Orion, Mich. (1987).
"Modular Torque Sensors", Sensor Developments Inc., Lake Orion, Mich. (1988).
"Reaction Torque Sensors, Flange Mounted", Sensor Developments Inc., Lake Orion, Mich.
"Measurements From Rotating Equipment Around the World", Wireless Data Corp., Mountain View, Calif.

*Primary Examiner*—Richard E. Chilcot, Jr.
*Assistant Examiner*—R. Biegel
*Attorney, Agent, or Firm*—James E. McGinness

[57] ABSTRACT

A non-contact system and method for measuring torsional wave propagation along a rotating shaft as well as static angular deflection due to a constant applied torque. The relative twist angle between two cross-sectional portions of the rotating shaft separated by a predetermined distance is detected over time and then the axial variation of torque along the rotating shaft is determined as a function of relative twist angle. Detection is carried out electro-optically using a pair of photodetectors and bands of reflective marks adhered on the circumferential surfaces of the two cross-sectional portions. Axial variation of torque is determined by determining variations in the phase difference between pulse trains output by the photodetectors.

14 Claims, 2 Drawing Sheets

ROTATING SHAFT VIBRATION MONITOR

This is a continuation of application Ser. No. 08/007,929 filed on Jan. 25, 1993, now abandoned.

FIELD OF THE INVENTION

This invention relates generally to the monitoring of torque in rotating machinery. In particular, the method and apparatus of the invention are useful in detecting and measuring torsional vibrations in pump shafts.

BACKGROUND OF THE INVENTION

Shaft torque in rotating machinery is an important quantity needed for the design and monitoring of a system. In the past, the torque was calculated using approximate methods on the basis of rough measurement of the produced or consumed power. These methods provided approximate estimates of the average torque value under constant pump conditions, but were insufficient to provide the local variation of the torque along the shaft (i.e., torsional wave propagation) during transient conditions, e.g., when the load, torque or speed of rotation of the shaft is changed. Recently, instruments such as torque meters have been used to measure the shaft torque.

The majority of conventional torque meters use either of two principal methods for data collection. One type is based on strain gauges placed on the shaft with data collection through slip rings. The other type uses strain gauges on the shaft in conjunction with radio or magnetic transmitters for the data collection. Both of these methods entail significant alteration of the shaft and require open space on the shaft which is normally unavailable. Some torque meters require cutting of the shaft and insertion of the transducers. Electrical noise can be induced in the data transmission, leading to unacceptable errors. The insertion of mechanical sensing and data collection may itself reduce the useful life of the rotating part due to additional weight, misalignment and wear.

Therefore, a need exists for a less complicated, more accurate method of measuring the torque in rotating shafts which does not need a long free span and can be applied at different locations along the shaft.

Torsional vibrations in shafts of circular cross section are described by methods that are known in continuum mechanics. In particular, the angle $\theta$ through which a general cross section rotates about its equilibrium position obeys the differential equation:

$$\frac{1}{c^2} \frac{\partial^2 \theta}{\partial t^2} = \frac{\partial^2 \theta}{\partial z^2} + \left[ \frac{1}{J(z)} \frac{\partial J}{\partial z} \right] \frac{\partial \theta}{\partial z} \; ; \; c^2 = \frac{E_s g_0}{\rho}$$

where J(z) is the polar moment of inertia of the circular shaft (either hollow or solid), $E_s$ is the shear modulus, $\rho$ is the density of the shaft, and $g_0$ is the acceleration of gravity. The torque T is related to the angular displacement by:

$$T(z,t) = E_s J(z) \frac{\partial \theta}{\partial z}$$

Therefore, measurement of the angular displacement variation along the shaft, in general, implies deduction of the torque in the shaft.

For shafts which have uniform or slowly varying properties, the bracketed term in the above wave equation is small and can be neglected. This is the simplest case, with solutions that are traveling waves or standing waves (a superposition of two traveling waves). Such solutions can be expressed mathematically as:

$$\theta(z,t) = \theta_0(e^{i(\omega t - kz)} \pm e^{-i(\omega t - kz)}); \; k = \frac{\omega}{c}$$

Therefore, the vibrational torque is:

$$T(z,t) = -ik\theta_0 E_s J(z) (e^{i(\omega t - kz)} \pm e^{-i(\omega t - kz)})$$

whose real part is:

$$Re[T(z,t)] = 2k\theta_0 E_s J(z) \sin(\omega t - kz)$$

The amplitude coefficient $\theta_O$ is determined by the driving function amplitude operating on the end of the shaft.

These relationships imply that dynamic torque can be inferred from measurements of the properties of torsional wave propagation in the shaft. If the shaft is very nonuniform, then interpretation of the measurements is more complicated, yet feasible using series solutions of the more general differential equation. For example, a continuously variable shaft may possess a polar moment of inertia described by:

$$J(z) = J_0 \frac{z}{z_0} \; ; \; z_0 \leq z \leq z_{max}$$

The wave equation for this case becomes:

$$\frac{1}{c^2} \frac{\partial^2 \theta}{\partial t^2} = \frac{\partial^2 \theta}{\partial z^2} + \frac{1}{z} \frac{\partial \theta}{\partial z}$$

whose solution is known in terms of tabulated infinite series, called zero-order Hankel functions of the second kind:

$$\theta(z,t) = \theta_O H^{(2)}_0(kz) e^{i\omega t}$$

If a time-varying torque of amplitude $T_O$ is applied at $z = z_O$, the amplitude of the angular displacement is determined by:

$$T(z-z_O,t) = T_O e^{i\omega t} = k E_s J_O \theta_O H^{(2)}_1(kz_O) e^{i\omega t}$$

from which we find:

$$\theta_0 = \frac{T_0}{k E_s J_0 H^{(2)}_1(kz_0)}$$

The torque in the shaft is then:

$$T(z,t) = \frac{T_0}{H^{(2)}_1(kz_o)} \left( \frac{z}{z_o} \right) H^{(2)}_1(kz) e^{i\omega t}$$

For short-wavelength vibrations, the Hankel function becomes:

$$\lim_{kz \to \infty} H^{(2)}_1(kz) \to \sqrt{\frac{2}{\pi kz}} \; e^{-i(kz - 3\pi/4)} = \frac{-(1+i)}{\sqrt{\pi kz}} e^{-ikz}$$

so the torque approaches a phase-shifted traveling wave propagating toward positive z:

$$T(z,t) \to -\frac{(1+i)}{H_1^{(2)}(kz_0)} \sqrt{\frac{z}{z_0}} \frac{T_0}{\sqrt{\pi k z_0}} e^{i(\omega t - kz)};$$

$z_0 \leq z \leq Z_{max}$; $kZ >> 1$

This result shows that torque is measurable as a traveling wave, even though the shaft is nonuniform.

SUMMARY OF THE INVENTION

The invention lies in a non-contact method for measuring torsional wave propagation along a rotating shaft as well as static angular deflection due to a constant applied torque. The method is carried out using an apparatus which is simple and easy to implement on existing or new shafts. The method requires no alteration of the shaft configuration and accurately and remotely measures the properties of torsional waves propagating along rotating shafts, such as those used in pumps. The method of the invention enables measurement of phase velocity (or wave number) as well as torque for propagating or standing torsional waves.

The spatial variation of the torque in the shaft can be deduced using electro-optical methods. Digitized electro-optical data is employed to control noise and to directly measure torsional vibration frequencies and amplitudes without direct contact devices, such as strain gauges.

Further, the unique properties of digital electronics systems are used to store, analyze and display the frequency and pulse-train data obtained while the shaft is turning. As a result, the frequency, wave number and torque can be computed and stored over a period of service time, thereby enabling the history of torsional shaft vibrations to be tracked and providing the basis for predicting potential pump failures of the system or changes of system characteristics.

Thus, the invention eliminates the existing disadvantages of conventional torque meters and provides a means for collecting torsion data with a high accuracy heretofore unattainable with conventional torque measuring devices.

DETAILED DESCRIPTION OF THE PREFERRED EMBODIMENT

The method and apparatus of the invention are described below with reference to a uniform shaft model for the sake of simplicity and convenience. However, it is understood that the same apparatus is applicable to a wide variety of shaft configurations. In particular, more sophisticated data processing and analysis methods can be employed for nonuniform cases.

Figure 1:
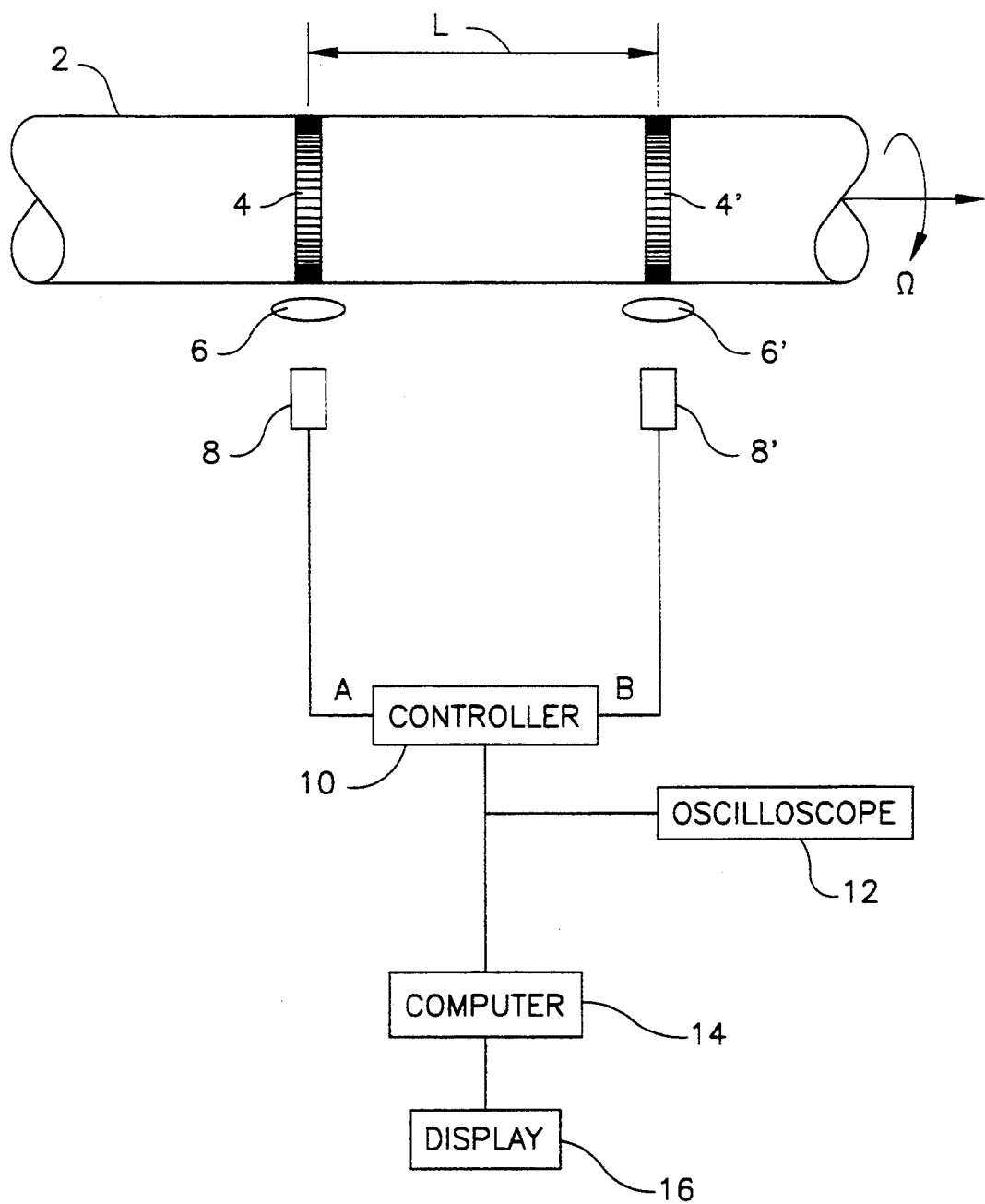
FIG. 1 is a schematic of a rotating shaft vibration monitor in accordance with the preferred embodiment of the invention.

As shown in FIG. 1, the rotating shaft 2 has affixed to it two thin circumferential bands 4 and 4', separated by a distance L. Preferably the bands are taped or otherwise adhered on the shaft. Each band is inscribed with an array of parallel lines or marks circumferentially distributed around the periphery of the shaft when the band is mounted thereon. It is convenient, although not necessary, that the inscribed marks on each band be distributed at equal intervals and that the marks on one band line up with their counterparts on the other band. The lines or marks have an optical property different than that of the spaces between the notches or marks, e.g., the lines or marks are reflective and the intervening spaces are not reflective.

In the preferred embodiment, each band is illuminated with a respective light source 5 and 5'. Light reflected from the marks of each band is received by a pair of photodetectors 8 and 8' by way of corresponding focusing lenses 6 and 6' arranged in proximity to the bands. The lenses are designed to focus the reflected light from the lines or marks onto the photodetector windows. Each photodetector outputs a respective pulse of electric current to channels A and B in response to impingement of a reflected pulse of light on its detecting surface.

As the shaft rotates at angular velocity $\Omega$, the bands reflect light pulses that are separated in time by an interval:

$$\tau = \frac{d}{R\Omega}$$

where R is the shaft outer radius and d is the notch or mark spacing. If there is no torsional displacement, then the pulses will be in phase in channels A and B, i.e., their time sequences overlap when displayed on a dual-channel oscilloscope 12. For a steady rotational speed, the outputs of the two channels can be synchronized and displayed as standing wave patterns on display 16.

The controller 10 is a special-purpose data acquisition device, well-known in the art, that serves to acquire, filter and digitize the data, e.g., the time between pulses, so that the computer 14 can perform digital analysis of the pulse trains as required. As long as there is steady rotation without torsional vibrations, the computer function is simply to monitor the status of the standing pulse trains.

In the event of simple torsional vibrations in the shaft, the respective wave patterns (denoting variation in twist angle $\theta$ over time) are no longer in phase. In this case, the wave patterns for the twist angle $\theta$ oscillate about the "rest" position of the wave patterns, which is recorded in the computer. A snapshot in time then shows the phase shift of the wave patterns for the two channels relative to each other and relative to the zero-displacement wave pattern. By sampling the vibration at either band location at a sufficiently high rate, the frequency of the torsional wave propagating down the shaft can be computed. The phase shift between bands provides the information necessary to compute wave number, thereby allowing calculation of the phase velocity of the wave, from which the shear modulus of the shaft can be calculated. As shown above, the torsional wave amplitude is directly related to the local torque and the geometric and material properties of the shaft, so torque can be inferred from the measured torsional wave amplitude.

This point can be illustrated by a simple example. Assume that the torque is represented by a traveling wave propagating from left to right along the shaft:

$$T = A \cdot \sin[\phi(t,z)]$$

where the phase is a function of angular frequency $\omega$ and wave number k:

$$\phi(t,z) = \omega t - kz$$

and the amplitude A is proportional to the peak angular displacement $\theta_O$ to be determined by measurement:

$$A = 2kE_s J(z)\theta_O$$

Clearly, measurements of $\theta_O$ and k allow the direct calculation of torque amplitude, since $J(z)$ and $E_s$ can be assumed known for any particular shaft.

The frequency and wave number are given by:

$$\omega = \left.\frac{\partial\phi(t,z)}{\partial t}\right|_z$$

$$k = \left.\frac{\partial\phi(t,z)}{\partial z}\right|_t$$

Therefore, a recording of the phase at either value of z corresponding to the band positions can be analyzed to obtain the frequency. Analysis of the phase difference between the respective data streams of the two channels gives k, from which the phase velocity c can be calculated in accordance with the equation:

$$c = \omega/k$$

The digital data is acquired in a way to approximate the partial derivatives as follows:

$$\omega \simeq \frac{\delta\phi}{\tau}\,;\; \delta\phi = \frac{N\pi}{l}\,;\; k \simeq \frac{\phi(B) - \phi(A)}{L}$$

Here, the number of zero crossings, N, occurring in the time interval $\Delta t = l.\tau$ at either location A or B defines the phase increment $\delta\phi$. Thus, the phase velocity is approximated by:

$$c \simeq \left[\frac{N\pi}{\phi(B) - \phi(A)}\right]\left[\frac{RL}{ld}\right]\Omega$$

assuming that the angular velocity $\Omega$ of the shaft is constant. The circular frequency f is:

$$f \simeq \frac{N}{2l\tau}$$

Figure 2:
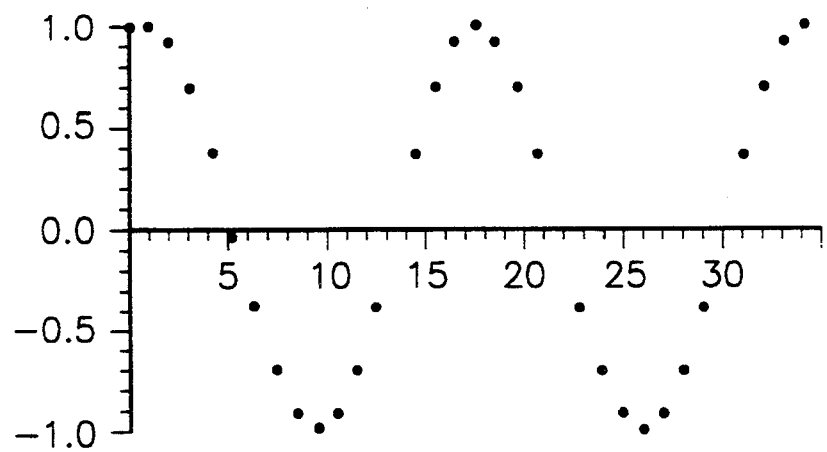
FIGS. 2 and 3 are graphs respectively depicting the normalized, sampled data streams for the respective channels of the preferred embodiment shown in FIG. 1.
Figure 3:
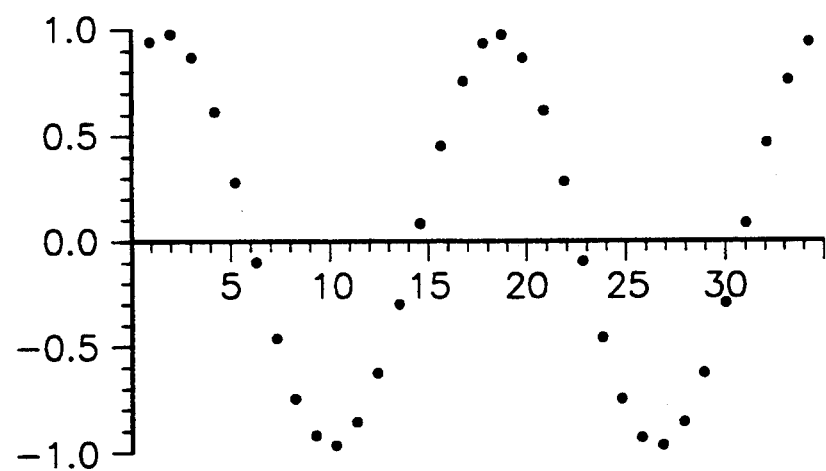

The normalized, sampled data streams for channels A and B are as shown in FIGS. 2 and 3. The ordinate is the normalized or relative twist angle $\theta$ plotted relative to a base line representing the zero twist angle associated with a static torque. The abscissa in each plot is related to time in increments of $\tau$. Channel B data is shifted slightly to the right of channel A data because of the phase lag generated as the torsional wave propagates the distance L (FIG. 1) along the shaft. This phase difference is denoted by $[\phi(B) = \phi(A)]$ in the above equations. The sampling rate is sufficiently high to exclude aliasing for this example, so the frequency can be computed from either waveform (channel A or B).

In a pure mode of vibration, the measured frequency could actually be any multiple of the fundamental torsion frequency. However, this redundancy can be eliminated on physical grounds, since the fundamental frequency can be approximated by analysis. If the shaft is vibrating in a superposition mode, involving the weighted sum of more than one normal mode, then the spectral character can be measured using this technique.

The method and apparatus of the present invention can also be used to deduce the static deflection due to a constant applied torque, e.g., after transient shaft conditions have been damped over time. This is a special case of the more general disclosure given above, which may be important in specific applications. For example, if the shaft length $L_s$ is short and the excitation frequency is low, then the inequality:

$$\left(\frac{\rho L_s \omega}{E_s g_0}\right)^2 << 1$$

is satisfied. In this case, k is small compared to $L_s$, so the angular displacement is given by:

$$\theta(z) \simeq \frac{T_0}{E_s}\int_0^z \frac{dz}{J(z)} + \theta_0$$

where $T_O$ is the applied torque and $\theta_O$ is a reference angle (that may be zero). In general, the moment of inertia can be represented by a power-series expansion of the form:

$$\frac{1}{J(z)} = \frac{1}{J_0}\sum_{i=0}^{\infty} C_i z^i$$

for all z (distance along the shaft). The integral in the previous equation can then be evaluated term-by-term to obtain:

$$\theta(z) \simeq \frac{T_0}{J_0 E_s}\sum_{i=0}^{\infty} C_i \frac{z^{i+1}}{(i+1)} + \theta_0$$

If the shaft is uniform and homogeneous, then $C_O$ is unity and all other coefficients are zero in the series. For nonuniform shafts, the $C_i$ can be determined from the shaft configuration by measurement and analysis techniques that are well known. In the simplest case of a uniform shaft, the above power-series expansion implies that the angular twist increases linearly with distance from the point of the applied torque. Therefore, the relative displacements of the two inscribed bands on the shaft surface can be related to the applied torque(s) on the shaft as it rotates. This can be shown by inserting the equations for $[J(z)]^{-1}$ and $\theta(z)$ into the general expression relating torque and deflection angle to obtain:

$$T_0 = \frac{J_0 E_s [\theta(B) - \theta(A)]}{L}$$

where A, B and L refer to the configuration of FIG. 1.

Since all electronic systems contain noise, the signals must be properly conditioned to minimize noise, especially in the mechanical vibrations spectrum. Means for accomplishing this are commonplace, especially in differential electronics systems. This allows frequency detection hardware, or software, to effectively and accurately measure the frequency of vibration. Such devices are available as standard additions to many commercially available digital oscilloscopes and/or computers.

The detectable means adhered on the rotating shaft may comprise bands with reflective marks and nonreflective spaces therebetween or bands with nonreflective marks and reflective spaces therebetween. Alternative methods of generating the data, such as eddy-current probes, magnetic pick-ups, and infra-red illumination and detection, are equally suited for use in the invention. These and other variations and modifications of the disclosed preferred embodiment will be readily apparent to practitioners skilled in the art of position detection. All such variations and modifications are intended to be encompassed by the claims set forth hereinafter.

We claim:

1. A system for monitoring an effect of torque on a rotating shaft, comprising:
   first detectable means circumferentially arranged on an outer surface of said rotating shaft at a first axial location thereof and having a property which varies repeatedly about a circumference;
   second detectable means circumferentially arranged on the outer surface of said rotating shaft at a second axial location thereof and having a property which varies repeatedly about said circumference, said second axial location being separated from said first axial location by a predetermined distance;
   first detecting means for outputting a first electrical signal which varies in dependence on a first local value of said repeatedly varying property for a portion of said first detectable means located opposite to a window of said first detecting means;
   second detecting means for outputting a second electrical signal which varies in dependence on a second local value of said repeatedly varying property for a portion of said second detectable means located opposite to a window of said second detecting means; and
   processing means for computing a wave number of a torsional wave propagating axially in said rotating shaft in dependence on variations in a difference in phase angles between said first and second electrical signals.

2. The rotating shaft monitoring system as defined in claim 1, further comprising first means for directing light onto said first detectable means such that light reflected therefrom impinges on said first detecting means and second means for directing light onto said second detectable means such that light reflected therefrom impinges on said second detecting means.

3. The rotating shaft monitoring system as defined in claim 2, wherein said repeatedly varying property is reflectivity, and said first and second detecting means respectively comprise first and second photodetectors for outputting an electrical signal in response to the impingement of light reflected from said first and second detectable means respectively.

4. The rotating shaft monitoring system as defined in claim 3, further comprising a first focusing lens arranged between said first photodetector and said first detectable means and a second focusing lens arranged between said second photodetector and said second detectable means.

5. The rotating shaft monitoring system as defined in claim 1, wherein said first and second detectable means are arranged so that when said shaft is stationary, said varying properties of said first detectable means have a constant phase relationship with said varying properties of said second detectable means.

6. The rotating shaft monitoring system as defined in claim 1, wherein said first and second electrical signals comprise first and second pulse trains respectively, and said processing means comprise means for quantizing the time intervals between corresponding pulses of said first and second pulse trains.

7. The rotating shaft monitoring system as defined in claim 6, further comprising means for displaying the first and second pulse trains superimposed on each other.

8. The rotating shaft monitoring system as defined in claim 6, wherein said processing means further comprises means for determining the relative twist angle between first and second cross-sectional portions of said rotating shaft at said first and second axial locations over time in dependence on said quantized time intervals, and further comprising means for displaying first and second wave patterns showing the variation of said relative twist angle over time for said first and second cross-sectional portions.

9. A system for monitoring an effect of torque on a rotating shaft, comprising;
   a first plurality of detectable means circumferentially distributed along an outer surface of said rotating shaft at a first axial location thereof;
   a second plurality of detectable means circumferentially distributed at said equal intervals along the outer surface of said rotating shaft at a second axial location thereof, said second axial location being separated from said first axial location by a predetermined distance;
   first detecting means for outputting a pulse in response to each event wherein one of said first plurality of detectable means is located at a first predetermined angular position opposing said first detecting means, said pulses output by said first detecting means forming a first pulse train;
   second detecting means for outputting a pulse in response to each event wherein one of said second plurality of detectable means is located at a second predetermined angular position opposing said second detecting means, said pulses output by said second detecting means forming a second pulse train;
   processing means for computing a wave number of a torsional wave propagating axially in said rotating shaft in dependence on variations in a difference in phase angles between corresponding pulses of said first and second pulse trains, and
   first means for directing light onto said rotating shaft at said first axial location such that light reflected by said first detectable means impinges on said first detecting means and second means for directing light onto said rotating shaft at said second axial location such that light reflected by said second detectable means impinges on said second detecting means.

10. The rotating shaft monitoring system as defined in claim 9, wherein said first and second detecting means respectively comprise first and second photodetectors for outputting an electrical signal in response to the impingement of light reflected from said first and second detectable means respectively, further comprising a first focusing lens arranged between said first photodetector and said first detectable means and a second focusing lens arranged between said second photodetector and said second detectable means.

11. A system for monitoring an effect of torque on a rotating shaft, comprising:
- a first plurality of detectable means circumferentially distributed along an outer surface of said rotating shaft at a first axial location thereof;
- a second plurality of detectable means circumferentially distributed at said equal intervals along the outer surface of said rotating shaft at a second axial location thereof, said second axial location being separated from said first axial location by a predetermined distance;
- first detecting means for outputting a pulse in response to each event wherein one of said first plurality of detectable means is located at a first predetermined angular position opposing said first detecting means, said pulses output by said first detecting means forming a first pulse train;
- second detecting means for outputting a pulse in response to each event wherein one of said second plurality of detectable means is located at a second predetermined angular position opposing said second detecting means, said pulses output by said second detecting means forming a second pulse train;
- processing means for computing a wave number of a torsional wave propagating axially in said rotating shaft in dependence on variations in a difference in phase angles between corresponding pulses of said first and second pulse trains, wherein said processing means comprise means for quantizing the time intervals between corresponding pulses of said first and second pulse trains and means for determining the relative twist angle between first and second cross-sectional portions of said rotating shaft at said first and second axial locations respectively over time in dependence on said quantized time intervals, and
- means for displaying first and second wave patterns showing the variation of said relative twist angle over time for said first and second cross-sectional portions.

12. A method for monitoring an effect of torque on a rotating shaft, comprising the steps of:
- detecting the time at which predetermined circumferential portions of said rotating shaft at a first axial location thereof reach a first predetermined angular position;
- outputting a first electrical signal which varies as a function of detection of said predetermined circumferential portions at said first predetermined angular position;
- detecting the time at Which predetermined circumferential portions of said rotating shaft at a second axial location thereof reach a second predetermined angular position;
- outputting a second electrical signal which varies as a function of detection of said predetermined circumferential portions at said second predetermined angular position;
- computing a wave number of a torsional wave propagating axially in said rotating shaft in dependence on variations in a difference in phase angles between said first and second electrical signals, wherein said first electrical signal comprises a first train of electrical pulses and said second electrical signal comprises a second train of electrical pulses and said variations in a difference in phase angles are determined by quantizing the time intervals between corresponding pulses of said first and second pulse trains; and
- determining the relative twist angle between first and second cross-sectional portions of said rotating shaft at said first and second axial locations respectively over time in dependence on said quantized time intervals, and displaying first and second wave patterns showing the variation of said relative twist angle over time for said first and second cross-sectional portions.

13. The rotating shaft monitoring method as defined in claim 12, further comprising the steps of:
- arranging a first plurality of detectable means along the circumferential surface of said rotating shaft at said first axial location thereof; and
- arranging a second plurality of detectable means along the circumferential surface of said rotating shaft at said second axial location thereof,
- wherein said first and second detectable means are arranged so that when said shaft is stationary, said first detectable means have a constant phase relationship to said second detectable means.

14. The rotating shaft monitoring method as defined in claim 13, wherein said first and second detectable means are reflective, and said first and second trains of electrical pulses are output by first and second photodetectors in response to the detection of light reflected from said first and second detectable means.

* * * * *